United States Patent
Garot et al.

(10) Patent No.: US 12,018,712 B2
(45) Date of Patent: Jun. 25, 2024

(54) REFRACTORY ANCHOR AND ASSEMBLIES THEREOF

(71) Applicant: Silicon Refractory Anchoring Systems B.V., Wateringen (NL)

(72) Inventors: Jerome Michael Garot, Wateringen (NL); Danielle Francesca Garot, Wateringen (NL); Wouter Garot, Wateringen (NL)

(73) Assignee: SILICON REFRACTORY ANCHORING SYSTEMS B.V., Wateringen (NL)

( * ) Notice: Subject to any disclaimer, the term of this patent is extended or adjusted under 35 U.S.C. 154(b) by 698 days.

(21) Appl. No.: 16/855,423

(22) Filed: Apr. 22, 2020

(65) Prior Publication Data

US 2020/0340510 A1  Oct. 29, 2020

(30) Foreign Application Priority Data

Apr. 26, 2019 (NL) ..................................... 2023010

(51) Int. Cl.
  *F16B 5/08* (2006.01)
  *B23K 9/20* (2006.01)
  *F16B 37/06* (2006.01)

(52) U.S. Cl.
  CPC .................. *F16B 5/08* (2013.01); *B23K 9/20* (2013.01); *F16B 37/061* (2013.01)

(58) Field of Classification Search
  CPC . F16B 5/08; F16B 37/061; B23K 9/20; B23K 1/0008; F27D 1/141
  USPC .................. 52/334, 378, 443, 506.02, 747.13
  See application file for complete search history.

(56) References Cited

U.S. PATENT DOCUMENTS

| | | | | |
|---|---|---|---|---|
| 4,680,908 | A * | 7/1987 | Crowley | F23M 5/04 52/378 |
| 4,711,186 | A * | 12/1987 | Chen | B04C 5/085 52/378 |
| 6,393,789 | B1 * | 5/2002 | Lanclos | F27D 1/141 52/378 |
| 10,508,861 | B1 * | 12/2019 | D'Oracio De Almeida et al. | F27D 1/142 |
| 10,907,899 | B1 * | 2/2021 | Lanclos | F27D 1/141 |
| 2016/0047124 | A1 * | 2/2016 | Garot | B23K 9/207 29/525.13 |
| 2018/0320973 | A1 * | 11/2018 | Yoder | B01J 19/0053 |

* cited by examiner

*Primary Examiner* — Chris Q Liu
(74) *Attorney, Agent, or Firm* — Shumaker, Loop & Kendrick, LLP

(57) ABSTRACT

A refractory anchor including an elongated mounting pin having a first end and a second end opposite to the first end seen in the longitudinal direction of the elongated mounting pin, wherein the first end of the elongated mounting pin is weldable to an object, the refractory anchor further includes two anchor fins of which each has a first anchor fin section having a first side and an opposing second side located at a distance of the elongated mounting pin with respect to the first side, wherein the first side is connected to the elongated mounting pin.

19 Claims, 2 Drawing Sheets

REFRACTORY ANCHOR AND ASSEMBLIES THEREOF

TECHNICAL FIELD AND BACKGROUND

The invention relates to a refractory anchor comprising an elongated mounting pin having a first end and a second end opposite to the first end seen in the longitudinal direction of the elongated mounting pin, wherein the first end of the elongated mounting pin is weldable to an object, the refractory anchor further comprises two anchor fins of which each has a first anchor fin section having a first side and an opposing second side located at a distance of the elongated mounting pin with respect to the first side, wherein the first side is connected to the elongated mounting pin.

The invention further relates to an assembly comprising an object and a refractory anchor and to a method for providing an assembly.

US 2016/0047124 discloses a refractory anchor which is for example shown in FIG. 1, which comprises an anchoring nut fixated to a mounting pin, wherein the anchoring nut comprises three spaced anchor fins extending radially outwardly from the anchoring nut. The mounting pin is weldable to a metal object. The known refractory anchors provide excellent liner anchoring results. For providing a relatively strong anchoring hexagonal shape by means of the known refractory anchors at least three refractory anchors have to be mounted to a metal object before the lining material in liquid form can be applied.

SUMMARY

It is an object of the present invention to provide an improved refractory anchor. This object is achieved by the refractory anchor as disclosed herein.

The refractory anchor comprises an elongated mounting pin having a first end and a second end opposite to the first end seen in the longitudinal direction of the elongated mounting pin, wherein the first end of the elongated mounting pin is weldable to an object. The refractory anchor further comprises two anchor fins of which each has a first anchor fin section having a first side and an opposing second side located at a distance of the elongated mounting pin with respect to the first side, wherein the first side is connected to the elongated mounting pin. The two first anchor fin sections are located in one virtual plane, and a second anchor fin section is connected to the second side of each first anchor fin section. Seen from above the refractory anchor, each second anchor fin section branches off in a V-shaped manner from each first anchor fin section such that each first anchor fin section and each second anchor fin section together form a Y-shape on opposing sides to the elongated mounting pin.

This configuration with two first anchor fin sections located in one virtual plane provides a relatively strong refractory anchor and a basis for the second anchor fin sections to provide a refractory anchor having two Y-shapes on opposing sides to the elongated mounting pin. By means of this arrangement of the refractory anchor mimicking two half-hexagonal shapes, it becomes possible by using only two refractory anchors to make an open or closed hexagonal shape. Further, this arrangement makes it possible that by using three refractory anchors two closed hexagonal shapes can be made. Hence, the configuration of the refractor anchor enables hexagonal shapes by using relatively less refractory anchors. In this way, the number of refractory anchors to be installed, in particular the installation time for installing refractory anchors on relatively large surfaces, can be reduced drastically, whereas at the same time the inventors have found out that the refractory anchors provide excellent and long lasting results for anchoring lining material for protecting equipment against a high temperature and/or abrasive environment as a result of processes occurring inside vessels, conduits, cyclones and other installations. Further, the refractory anchor may be welded by stud welding to an object by means of the elongated mounting pin in a relatively fast manner. The anchor fins of the refractory anchor are mirror symmetrical with respect to a plane through the center line of the elongated mounting pin and perpendicular to the virtual plane in which the two first anchor fin sections of the refractory anchor extend.

In one aspect, each second anchor fin section branches off in a V-shaped manner from each first anchor fin section by means of a first anchor fin arm and a second anchor fin arm, wherein the angle between the first anchor fin arm and the second anchor fin arm lies between 60 and 110 degrees, preferably between 70 and 90 degrees. By means of the V-shaped anchor fin arms it becomes possible to withstand in an improved manner the thermal expansion, vibration and turbulence experienced in the abrasion resistant linings while in service. The anchor fin arms of the refractory anchor have proven to help mitigate this problem by obtaining a consistent vibration transfer through the object and the refractory anchors, in particular when the first anchor fin arm and the second anchor fin arm have substantially the same length. In addition, the other dimensions, such as height and thickness of the first anchor fin arm and the second anchor fin arm may be substantially identical to obtain a consistent vibration transfer.

The first anchor fin arm is located largely or completely at a higher height measured from the first end of the elongated mounting pin than the height of the second end of the elongated mounting pin with respect to the first end of the elongated mounting pin and/or the second anchor fin arm is located largely or completely at a lower height measured from the first end of the elongated mounting pin than the height of the second end of the elongated mounting pin with respect to the first end of the elongated mounting pin. After installation the hot or hottest side of the refractory anchor is the side which is furthest away from the object to which the refractory anchor has been welded. By providing a height difference between the first anchor fin arm and the second anchor fin arm, the lower second anchor fin arms may be located completely in the lining material or liner after installation, wherein each lower second anchor fin arm may be provided with at least one tab to improve the anchoring results. Each tab may have an angle with the lower second anchor fin arm between 80-100 degrees, preferably approximately 90 degrees. The two corners of the lower second anchor fin arm may be rounded. The rounded corner reduces the risks of cracks in the liner compared to conventional straight corners drastically, because in use the refractory anchor may experience thermal expansion and/or vibrations and as a result the sharp corners are able to cut into the cured lining material which may provide cracks/bursts in the liner. The higher first anchor fin arms may be configured for reducing a heat path towards the object on which the refractory anchor has been welded and/or to facilitate a more consistent vibration transfer. For example, the higher first anchor fin arms may be provided without any tabs.

In a further aspect, a first portion of the first side of each first anchor fin section is connected to a second end section of the elongated mounting pin located adjacent to, or forming, the second end of the elongated mounting pin, wherein a second portion of the first side of each first anchor fin section is not connected to the elongated mounting pin, wherein between the second portions of the first sides of the first anchor fin sections a space is provided, wherein the space is located above the second end of the elongated mounting pin seen in the longitudinal direction of the elongated mounting pin. This space provides stronger refractory anchors in vessels/cyclones in that the refractory anchors with these spaces are able to withstand higher temperatures. After installing the refractory anchor and after applying a lining material over the refractory anchor, the lining material fills the space and after curing the space is filled with liner. This liner in the space provides a temperature buffer, because the liner conducts heat less well than the refractory anchor, in particular the elongated mounting pin of the refractory anchor. After installation the hot side of the refractory anchor is the side which is furthest away from the object to which the refractory anchor has been welded. By providing the space between the sides of the anchor fin portions facing each other, which space is filled with heat-insulating liner, there is no direct heat path between the hot side located above upper sides of the anchor fin portions and the second end of the elongated mounting pin. By burying the further second end of the elongated mounting pin with heat-insulating liner provided in the space of the submerged section, the temperatures in the elongated mounting pin, in particular towards the end of the elongated mounting pin welded or weldable to an object, can be reduced drastically. Under certain high temperature conditions in the vessel/cyclone, a direct heat path may damage the weld between the refractory anchor and the object. In these high-temperature situation the submerged section extends the life-time of the refractory anchor, without requiring undesired short maintenance or inspecting intervals. Hence, by providing the liner temperature buffer in the submerged section there is no direct heat path between the hottest side of the refractory anchor and the end welded to the object, which provides a longer lasting refractory anchor configured to be used in vessels/cyclones configured for relatively high-temperature processes.

In a different aspect, each second portion of the first sides of the anchor fin sections has a cut-out. These cut outs provide improved anchoring results of the liner in the space between these first sides of the anchor fin portions facing each other and contribute in reducing a heat path from the hot side of the refractory anchor to the end of the elongated mounting pin welded or to be welded to the object.

Further, the elongated mounting pin may be advantageously made from a different material than the anchor fins and a connector to be discussed below if present. More specific, the elongated mounting pin is made from a first alloy and the anchor fins are made of a second alloy different from the first alloy. The first alloy is for example configured for optimal welding results of the elongated mounting pin to an object such as for example a backing plate. The anchor fins are made of a second alloy different from the first alloy, wherein the second alloy is configured for providing optimal anchoring results of the liner and/or for providing maximum protection against the high temperature and/or abrasive environment of processes occurring inside the vessel/cyclone. The elongated mounting pin is advantageously made of a material configured for stud welding the elongated mounting pin to an object, for example a metal plate. Hence, by using stud welding technique, the installation time of the refractory anchors is relatively fast, in particular compared to hand welding or spot welding.

In another aspect, the two anchor fins are connected to each other by a connector, wherein the connector is connected to the elongated mounting pin, wherein the connector and the anchor fin(s) are made in one piece and/or from one and the same material. Such a connector can be used to connect the anchor fin(s) in a fast manner to the elongated mounting pin and provides a strong, reliable and long lasting connection between the anchor fin(s) and the elongated mounting pin.

In a further aspect, the connector provides a through hole for receiving the elongated mounting pin for providing a connection between the elongated mounting pin and the connector. A relatively fast, simple, safe and operator-friendly technique is by providing the connection between the elongated mounting pin and the connector by friction fit, i.e. after positioning the elongated mounting pin into the through hole, a second end of the elongated mounting pin opposite to the end to be welded to the object is subjected to pressure such that a second end section directly located below the second end expands for fixing the second end section inside the through-hole of the connector. Such a connection can be provided in a relatively fast manner and has provided excellent long lasting results, in particular inside high temperature processing vessels/cyclones.

It is a further goal to provide an assembly comprising an object such as a metal plate and a refractory anchor. This goal is achieved with the claim directed to an assembly. The refractory anchor has been welded on the object, preferably by stud welding. The elongated mounting pin and the anchor fins are configured such that the height/distance between the anchor fins and the object to which the refractory anchor is welded is at least 20% of the total height of the refractory anchor. This height provides a spacing which enhances the flow of lining material, i.e. refractory cement, below the arms such that the risk of cavities in the lining material, in particular the liner after installation, is prevented or at least reduced. By using at least two refractory anchors in the assembly an open or closed hexagonal shape may be made and/or by using three refractory anchors two open or closed hexagonal shapes may be made.

It is also an object to provide a method for providing the above assembly. This object is achieved according to the claim directed to a method. The elongated mounting pin of the refractory anchor is connected to the object by stud welding, preferably drawn arc stud welding. Further, by using two refractory anchors an open or a closed hexagonal shape may be made on the object and/or by using three refractory anchors two open or closed hexagonal shapes may be made on the object.

BRIEF DESCRIPTION OF THE DRAWINGS

The present invention will be explained in more detail below with reference to the appended figures showing an exemplary embodiment of a refractory anchor.

DETAILED DESCRIPTION

Like parts are indicated by the same reference signs in the various figures.

Each feature disclosed with reference to the figure can also be combined with another feature disclosed in this disclosure including the claims, unless it is evident for a person skilled in the art that these features are incompatible.

Figure 1:
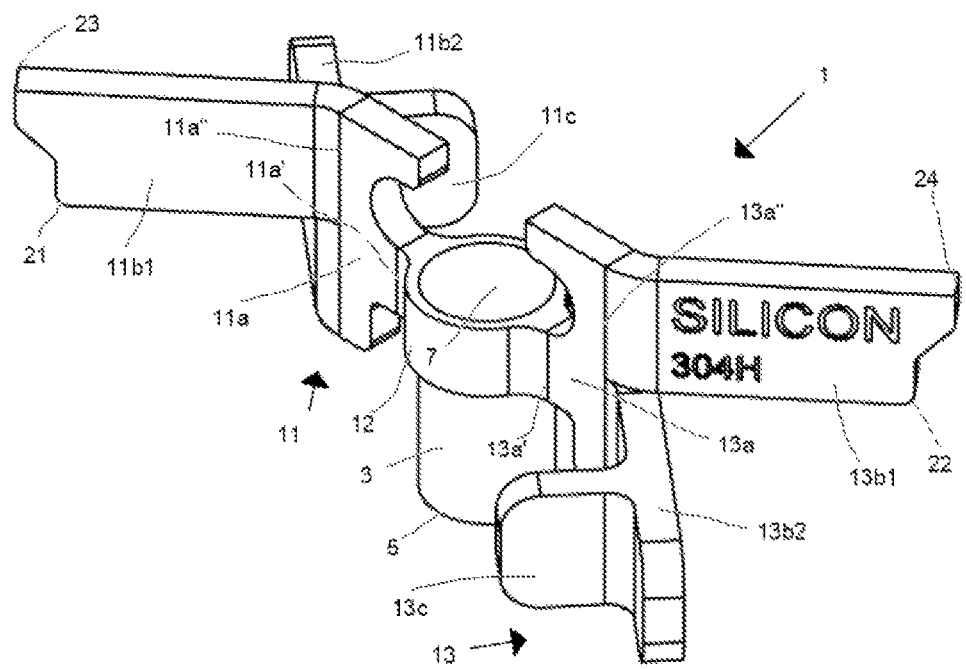
FIG. 1 shows a perspective view of a refractory anchor.
Figure 2:
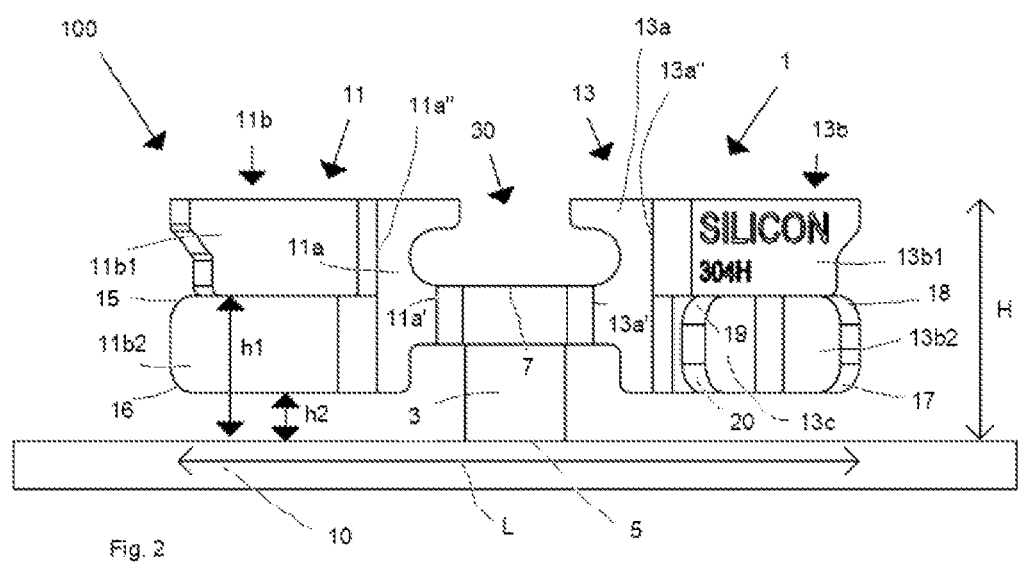
FIG. 2 shows a front view of an assembly.
Figure 3:
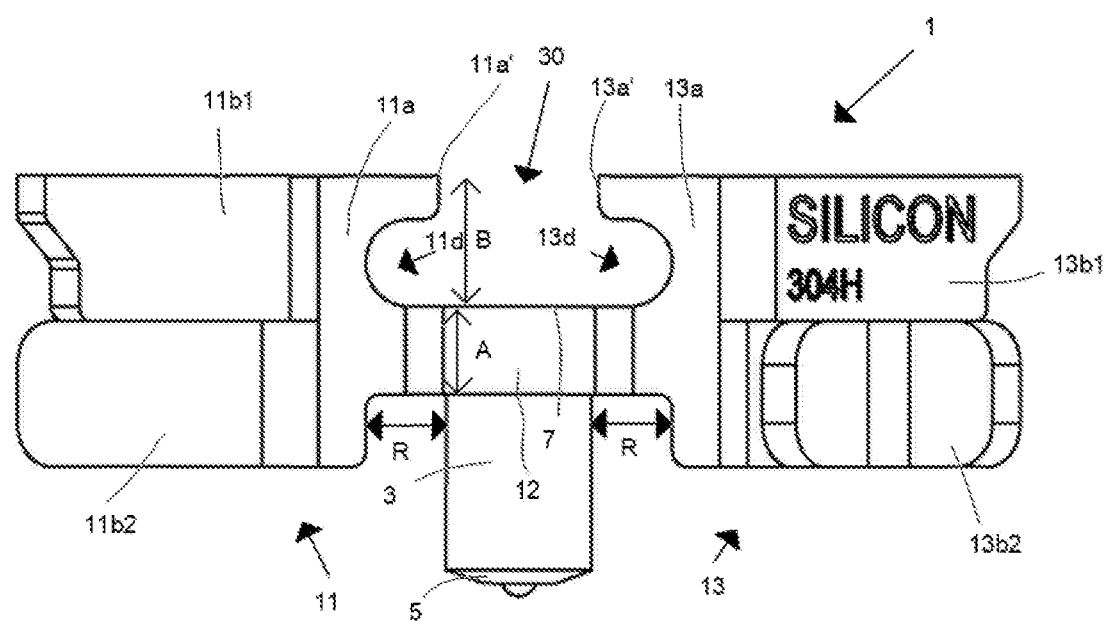
FIG. 3 shows a front view of the refractory anchor shown in FIG. 1.
Figure 4:
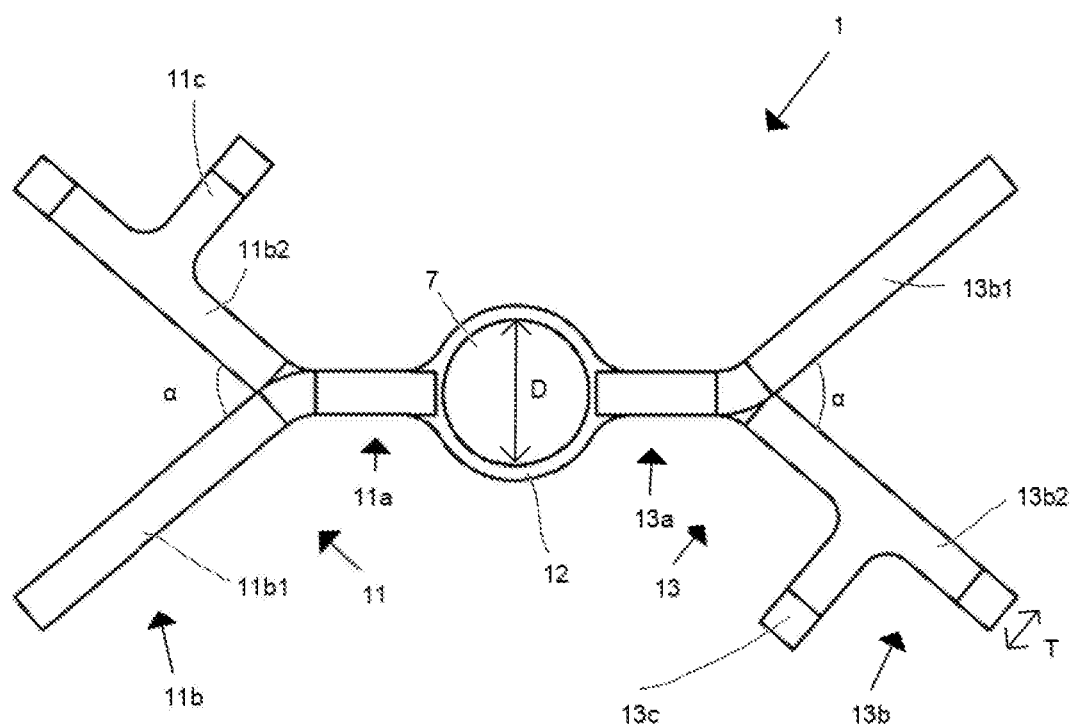
FIG. 4 shows a top view of the refractory anchor shown in FIGS. 1 and 3.

FIGS. 1-4 show various views of a refractory anchor 1, wherein in FIG. 2 an assembly 100 is shown comprising the refractory anchor 1 shown in FIGS. 1, 3 and 4, wherein the refractory anchor 1 has been welded on an object 10, preferably by stud welding.

The refractory anchor 1 comprises an elongated mounting pin 3 having a first end 5 and a second end 7 opposite to the first end 5 seen in the longitudinal direction of the elongated mounting pin 3, wherein the first end 5 of the elongated mounting pin 3 is weldable to the object 10.

The refractory anchor 1 further comprises two anchor fins 11, 13 of which each has a first anchor fin section 11a, 13a having a first side 11a', 13a' and an opposing second side 11a", 13a" located at a distance of the elongated mounting pin 3 with respect to the first side 11a', 13a', wherein the first side 11a', 13a' is connected to the elongated mounting pin 3 by a connector 12. The connector 12 and the anchor fins 11, 13 are made in one piece and from one and the same material.

The two first anchor fin sections 11a, 13a of the refractory anchor 1 are located in one virtual plane.

A second anchor fin section 11b, 13b is connected to the second side 11a", 13a" of each first anchor fin section 11a, 13a, wherein seen from above the refractory anchor 1 (see FIG. 4), each second anchor fin section 11b, 13b branches off in a V-shaped manner from each first anchor fin section 11a, 13a such that each first anchor fin section and each second anchor fin section together form a Y-shape on opposing sides to the elongated mounting pin 3. As explained above, this configuration of the refractory anchor provides a strong and long-lasting refractory anchor and enables to install closed hexagonal shapes by using relatively less refractory anchors, such that the installation time can be reduced drastically with the improved refractory anchor.

As shown in FIGS. 1 and 4, each second anchor fin section 11b, 13b branches off in a V-shaped manner from each first anchor fin section 11a, 13b by means of a first anchor fin arm 11b1; 13b1 and a second anchor fin arm 11b2, 13b2, wherein the angle α (FIG. 4) between the first anchor fin arm 11b1, 13b1 and the second anchor fin arm 11b2, 13b2 is 80 degrees. The angle α may extend between 60 and 110 degrees, preferably between 70 and 90 degrees.

The first anchor fin arm 11b1, 13b1 is located largely or completely at a higher height measured from the first end 5 of the elongated mounting pin 3 than the height of the second end 7 of the elongated mounting pin 3 with respect to the first end 5 of the elongated mounting pin 3. As a result, the side of the first anchor fin arm 11b1, 13b1 facing the object 10 after installation, is located at a first height h1 (see FIG. 2). The second anchor fin arm 11b2, 13b2 is located largely or completely at a lower height measured from the first end 5 of the elongated mounting pin 3 than the height of the second end 7 of the elongated mounting pin 3 with respect to the first end 5 of the elongated mounting pin 3. As a result, the side of the second anchor fin arm 11b2, 13b2 facing the object 10 after installation, is located at a second height h2 (see FIG. 2). As is clearly shown in FIG. 2, the height h1 is larger than the height h2, preferably at least two times larger.

By providing a height difference between the first anchor fin arm 11b1, 13b1 and the second anchor fin arm 11b2, 13b2, the lining material in liquid form is able to flow in an optimal manner around the refractory anchor 1 such that excellent anchoring results can be obtained and the risk of cavities in the (cured) liner can be reduced. The lower second anchor tin arms 11b2, 13b2 may be located completely in the lining material or liner after installation, wherein each lower second anchor fin arm may be provided with at least one tab 11c, 13c to further improve the anchoring effect of the refractory anchor 1. Each tab 11c, 13c has an angle with the lower second anchor fin arm 11b2, 13b2 of approximately 90 degrees. The height of each tab 11c, 13c corresponds with the height of each lower second anchor fin arm 11b2, 13b2, and/or the thickness of each tab 11c, 13c corresponds with the thickness of each lower second anchor fin arm 11b2, 13b2. The two corners 15, 16, 17, 18 of each lower second anchor fin arm 11b2, 13b2 may be rounded. In addition, the corners 19, 20 of the tabs 11c, 13c are rounded. The rounded corners in the lower second anchor fin, arm 11b2, 13b2 and the tabs 11c, 13c reduce the risks of cracks in the liner while in service. The higher first anchor fin arms 11b1, 13b1 are provided without any tabs and the lower corners 21, 22 (FIG. 1) of the higher first anchor fin arms 11b1, 13b1 are also rounded, whereas the upper corners 23, 24 of the higher first anchor fin arms 11b1, 13b1 have straight corners 23, 24 (FIG. 1), because these corners 23, 24 are flush with the cured liner or are located slightly above the cured liner after installation, such that these corners 23, 24 cannot cut into the liner/lining material.

A first portion of the first side 11a', 13a' of each first anchor fin section 11a, 13a is connected by the connector 12 to a second end section which is indicated in FIG. 3 by arrow A of the elongated mounting pin 3 located adjacent to the second end 7 of the elongated mounting pin 3. The connector 12 comprises a through hole for receiving the second end section A of the elongated mounting pin 3 for providing a connection between the elongated mounting pin 3 and the connector 12. A relatively fast, simple, safe and operator-friendly technique is by providing the connection between the elongated mounting pin 3 and the connector 12 by friction fit, i.e. after positioning the elongated mounting pin 3 into the through hole, the second end 7 of the elongated mounting pin 3 is subjected to pressure such that a second end section A directly located below the second end 7 expands for fixing the second end section A inside the through-hole of the connector 12. Such a connection can be provided in a relatively fast manner and has provided excellent long lasting results, in particular inside high temperature processing vessels/cyclones.

A second portion of the first side 11a', 13a' of each first anchor fin section 11a, 13a is indicated by arrow B in FIG. 3, wherein this second portion B is not connected to the connector 12, wherein between the second portions of the first sides 11a', 13a' of the first anchor fin sections 11a, 13a a space 30 is provided, wherein the space 30 is located above the second end 7 of the elongated mounting pin 3 seen in the longitudinal direction of the elongated mounting pin 3. This space 30 provides stronger refractory anchors in vessels/cyclones in that the refractory anchors provided with these spaces 30 are able to withstand higher temperatures. After installing the refractory anchor 1 and after applying a lining material over the refractory anchor 1, the lining material fills the space 30 and after curing the space 30 is filled with liner. This liner in the space 30 provides in an advantageous manner a temperature buffer as mentioned in the description above. Each second portion B of the first sides 11a, 13 of the anchor fin sections has a cut-out 11d, 13 (FIG. 3) for improving the anchoring results of the liner in the space 30. A third portion of the first side 11a', 13a' of each first anchor fin section 11a, 13a, i.e. the first portion is located between the second and third portion of the first side 11a', 13a' of each first anchor fin section 11a, 13a, is also not connected to the connector 12, and there is a distance indicated by arrow R (FIG. 3) between the third portion of each anchor fin 11, 13 facing each other and the elongated mounting pin 3. This distance R improves the flow of the liquid lining material and reduces after installation a direct or relatively short heat path between upper sides of the anchor fins 11, 13 and the end 5 of the elongated mounting pin 3 weldable or welded to object 10, such that a refractory anchor can be provided with an improved configuration to withstand high temperatures on the "hot side" of the refractory anchor 1. After installation, the upper sides of the refractory anchor 1 are facing the "hot side".

The elongated mounting pin 7 is advantageously made from a different material than the anchor fins 11, 13 and the connector 12. More specific, the elongated mounting pin 7 is made from a first alloy and the anchor fins 11, 13 and the connector 12 are made of a second alloy different from the first alloy. The first alloy is for example configured for optimal welding results of the elongated mounting pin 3 to an object 10 such as for example a backing plate. The anchor fins 11, 13 and the connector 12 are made of a second alloy different from the first alloy, wherein the second alloy is configured for providing optimal anchoring results of the liner and/or for providing maximum protection against the high temperature and/or abrasive environment of processes occurring inside the vessel/cyclone. The elongated mounting pin 7 is advantageously made of a material configured for stud welding the elongated mounting pin to the object 10, such that the refractory anchor 1 can be stud welded, preferably drawn arc stud welded, to the object 10.

The refractory anchor 1 only comprises two anchor fins 11, 13, wherein the two Y-shapes (FIG. 4) on opposing sides to the elongated mounting pin 3 of the refractory anchor 1 mimic two half-hexagonal shapes. These two half-hexagonal shapes provide a refractory anchor with long lasting and excellent liner anchoring results. It becomes possible by using only two refractory anchors to make a closed hexagonal shape in a manner comparable with the (template) pattern as shown in FIG. 6 of US2016/00471224, but with the difference that by means of the refractory anchor 1 disclosed in this document, less refractory anchors are required for providing a closed hexagonal shape. Further, it is also possible that the two half-hexagonal shaped refractory anchors are arranged in a different pattern than the closed hexagonal pattern, i.e. for example a pattern in which the elongated mounting pins of the refractory anchors are not positioned in a grid pattern, but in a more offset manner. Such an offset pattern may be made more easily and in a faster manner, because it does not require or requires less aligning operations for installing the refractory anchors. In addition, an operator has more freedom to select the position of each refractory anchor with respect to the other refractory anchors, wherein this freedom may facilitate an easier and/or faster welding-process.

The longest dimension L (FIG. 2) of the refractory anchor 1 is relatively small, i.e. smaller than 20 cm for example approximately 7 cm. Each anchor fin 11, 13 may have a thickness indicated by arrow T (FIG. 4) smaller than 1 cm, for example approximately 3 mm. The height indicated by arrow H (FIG. 2) of the refractory anchor 1 measured from the object 10 is smaller than 7.5 cm, for example 2.5 cm. The elongated mounting pin and the anchor fins are configured such that the height/distance h2 between the anchor fins 11a, 13a and the object 10 to which the refractory anchor 1 is welded or is weldable is at least 20% of the total height H of the refractory anchor 1. The height/distance h2 between the anchor fins 11a, 13a and the object 10 improves the quality of the liner, in that by means of this height/distance h2 cavities in the lining material to be cured can be prevented or at least be reduced during installation of the refractory lining material.

As shown in the drawings the elongated mounting 3; 103 has a cylindrical shape. However, different shaped pins having corners for forming a pin having a polygonal cross-section can also be used, for example a plate shaped pin. The diameter indicated by arrow D (FIG. 4) of the elongated mounting 3 is smaller than 2.5 cm, for example 1 cm.

The invention claimed is:

1. A refractory anchor comprising:
an elongated mounting pin having a first end and a second end opposite to the first end seen in the longitudinal direction of the elongated mounting pin, wherein the first end of the elongated mounting pin is weldable to an object, the refractory anchor further comprises two anchor fins of which each has a first anchor fin section having a first side and an opposing second side located at a distance of the elongated mounting pin with respect to the first side, wherein the first side is connected to the elongated mounting pin, wherein the two first anchor fin sections are located in one virtual plane, and a second anchor fin section is connected to the second side of each first anchor fin section, wherein seen from above the refractory anchor, each second anchor fin section branches off in a V-shaped manner from each first anchor fin section such that each first anchor fin section and each second anchor fin section together form a Y-shape on opposing sides to the elongated mounting pin, wherein a first portion of the first side of each first anchor fin section is connected to a second end section of the elongated mounting pin located adjacent to, or forming, the second end of the elongated mounting pin, wherein a second portion of the first side of each first anchor fin section is not connected to the elongated mounting pin, wherein corners between an upper side of the anchor fins and the second portions of the first sides of the first anchor fin sections define an opening of a space which is located between the second portions of the first sides of the first anchor fin sections and above the second end of the elongated mounting pin seen in the longitudinal direction of the elongated mounting pin, wherein the elongated mounting pin is made from a first alloy and the two anchor fins are made of a second alloy, wherein uppermost edges of the second portions of the first sides of the two first anchor fin sections together define an uppermost peripheral edge of the refectory anchor that is discontinuous at the opening of the space defined above the second end of the elongated mounting pin.

2. The refractory anchor according to claim 1, wherein each second anchor fin section branches off in a V-shaped manner from each first anchor fin section by means of a first anchor fin arm and a second anchor fin arm, wherein the angle between the first anchor fin arm and the second anchor fin arm lies between 60 and 110 degrees.

3. The refractory anchor according to claim 2, wherein the first anchor fin arm and the second anchor fin arm have substantially the same length.

4. The refractory anchor according to claim 2, wherein the first anchor fin arm is located largely or completely at a higher height measured from the first end of the elongated mounting pin than the height of the second end of the elongated mounting pin with respect to the first end of the elongated mounting pin.

5. The refractory anchor according to claim 2, wherein the second anchor fin arm is located largely or completely at a lower height measured from the first end of the elongated mounting pin than the height of the second end of the elongated mounting pin with respect to the first end of the elongated mounting pin.

6. The refractory anchor according to claim 5, wherein corners of the second anchor fin arm are rounded.

7. The refractory anchor according to claim 1, wherein each second portion of the first sides of the anchor fin sections has a cut-out.

8. The refractory anchor according to claim 1, wherein the elongated mounting pin is made of a material configured for stud welding the elongated mounting pin to an object.

9. The refractory anchor according to claim 1, wherein the two anchor fins are connected to each other by a connector, wherein the connector is connected to the elongated mounting pin, wherein the connector and the two anchor fins are made in one piece, and/or the connector and the two anchor fins are made from the same material.

10. The refractory anchor according to claim 9, wherein the connector provides a through hole for receiving the elongated mounting pin for providing a connection between the elongated mounting pin and the connector, wherein the connection between the elongated mounting pin and the connector is provided by friction fit.

11. The refractory anchor according to claim 1, wherein a third portion of the first side of each first anchor fin section is not connected to the elongated mounting pin, and wherein lowermost edges of the third portions of the first sides of the two first anchor fin sections together define a lower peripheral edge that is discontinuous.

12. The refractory anchor according to claim 11, wherein the lower peripheral edge of the refractory anchor is discontinuous at a space defined between the lowermost edges of the third portions of the first sides of the two first anchor fin sections through which the mounting pin extends.

13. An assembly comprising an object and a refractory anchor that has been welded on the object, wherein
the refractory anchor comprising an elongated mounting pin having a first end and a second end opposite to the first end seen in the longitudinal direction of the elongated mounting pin, wherein the first end of the elongated mounting pin is weldable to an object, the refractory anchor further comprises two anchor fins of which each has a first anchor fin section having a first side and an opposing second side located at a distance of the elongated mounting pin with respect to the first side, wherein the first side is connected to the elongated mounting pin, wherein the two first anchor fin sections are located in one virtual plane, and a second anchor fin section is connected to the second side of each first anchor fin section, wherein seen from above the refractory anchor, each second anchor fin section branches off in a V-shaped manner from each first anchor fin section such that each first anchor fin section and each second anchor fin section together form a Y-shape on opposing sides to the elongated mounting pin, wherein a first portion of the first side of each first anchor fin section is connected to a second end section of the elongated mounting pin located adjacent to, or forming, the second end of the elongated mounting pin, wherein a second portion of the first side of each first anchor fin section is not connected to the elongated mounting pin, wherein corners between an upper side of the anchor fins and the second portions of the first sides of the first anchor fin sections define an opening of a space which is located between the second portions of the first sides of the first anchor fin sections and above the second end of the elongated mounting pin seen in the longitudinal direction of the elongated mounting pin, wherein the elongated mounting pin is made from a first alloy and the two anchor fins are made of a second alloy, wherein uppermost edges of the second portions of the first sides of the two first anchor fin sections together define an uppermost peripheral edge of the refractory ancho that is discontinuous at the opening of the space defined above the second end of the elongated mounting pin.

14. The assembly according to claim 13, wherein the elongated mounting pin and the anchor fins are configured such that the height/distance between the anchor fins and the object to which the refractory anchor is welded or is weldable is at least 20% of the total height of the refractory anchor.

15. The assembly according to claim 13, wherein by using two refractory anchors a hexagonal shape is made and/or by using three refractory anchors two hexagonal shapes are made.

16. A method for providing an assembly according to claim 13, wherein the elongated mounting pin of the refractory anchor is connected to the object by stud welding.

17. The method according to claim 16, wherein by using two refractory anchors a hexagonal shape is made on the object and/or by using three refractory anchors two hexagonal shapes are made on the object.

18. The assembly according to claim 13, wherein a third portion of the first side of each first anchor fin section is not connected to the elongated mounting pin, wherein lowermost edges of the third portions of the first sides of the two first anchor fin sections together define a lower peripheral edge that is discontinuous.

19. The assembly according to claim 18, wherein the lower peripheral edge is discontinuous at a space defined between the lowermost edges of the third portions of the first sides of the two first anchor fin sections through which the mounting pin extends.

\* \* \* \* \*